United States Patent Office 3,446,459
Patented May 27, 1969

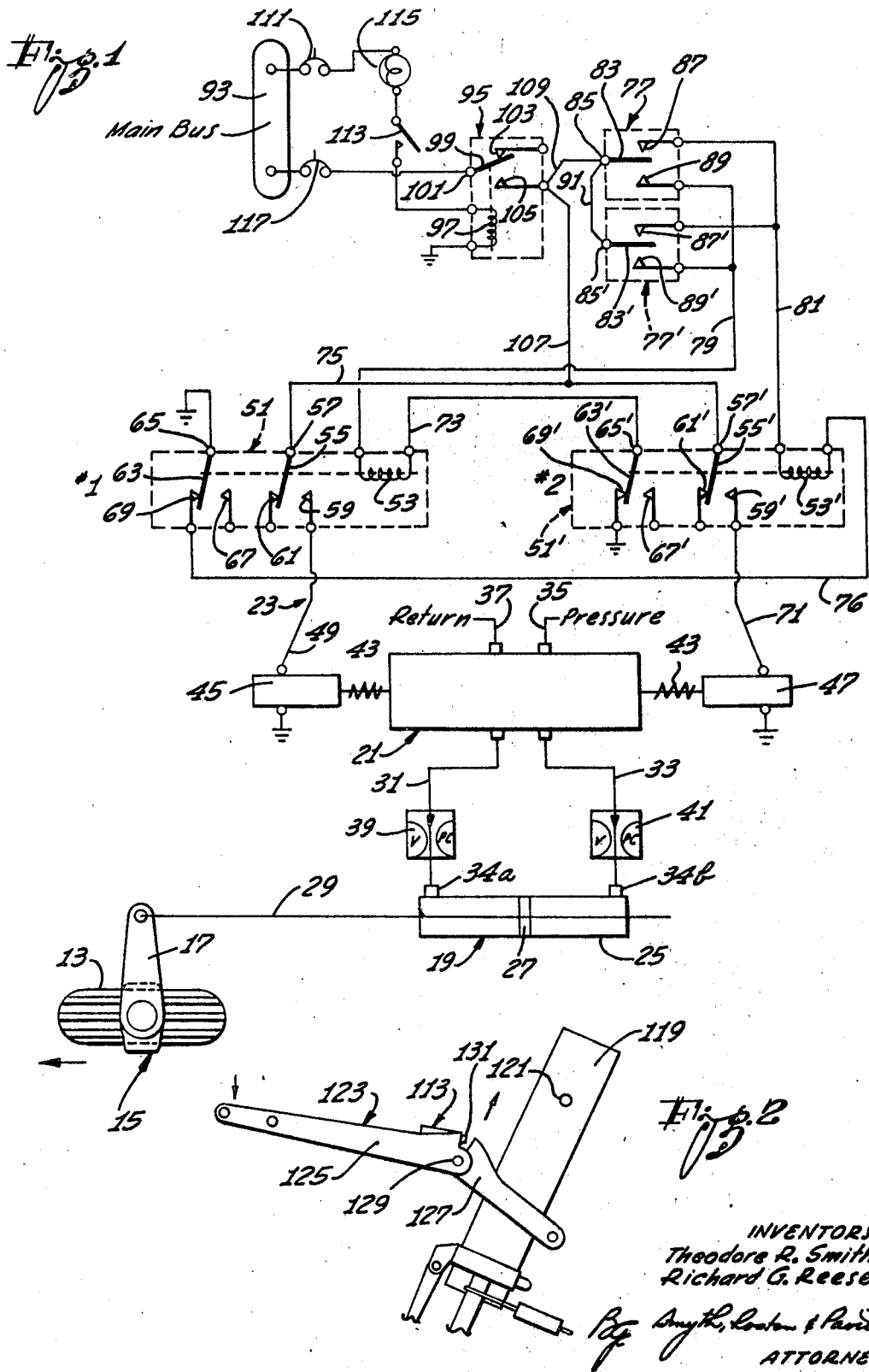

3,446,459
NOSE GEAR STEERING SYSTEM
Theodore R. Smith, Los Angeles, and Richard G. Reese, Northridge, Calif., assignors to Ted Smith Aircraft Company, Inc., Northridge, Calif., a corporation of California
Filed Nov. 14, 1966, Ser. No. 594,011
Int. Cl. B64c 25/50
U.S. Cl. 244—50                                7 Claims

ABSTRACT OF THE DISCLOSURE

This disclosure describes a nose gear steering system for an airplane which includes fluid actuator means for turning the nose gear to thereby impart steering movement thereto. A valve controls flow of fluid to the fluid actuator and therefore controls movement of the fluid actuator. The valve in turn is controlled by valve operator means which is preferably in the form of solenoid means. Appropriate circuit means are provided to permit the pilot to selectively energize the solenoid means to thereby impart steering movement to the nose gear.

---

This invention relates to a vehicle steering system and more particularly to a nose gear steering system for an aircraft.

Aircraft that have a forward or nose gear can be steered when the aircraft is on the ground by turning of the nose gear. Accordingly, many aircraft of this type accomplish the steering function in this manner.

One of the nose gear steering systems presently in use employs a hydraulic actuator to impart steering movement to the nose gear. A complex system of servomechanisms is employed to control and meter the flow of fluid to the hydraulic actuator and hence control the output of the actuator and the turning of the nose gear. This type of system is unsatisfactory in that it is very complex and expensive. In addition, the various servomechanisms may introduce a substantial weight penalty to the aircraft.

A second type of nose gear steering system has also been suggested. This system utilizes centering springs to normally bias the nose gear to a center or straight-ahead position. Steering is accomplished by differential braking which applies a torque to the nose gear which overcomes the biasing action of the centering springs to turn the nose gear. Although this system is much simpler than the servomechanism system described above, it is quite crude and causes extreme brake wear.

According to the present invention, a simple, reliable and inexpensive nose gear steering system is provided. The present invention eliminates the need for using the brakes to accomplish steering and also eliminates the various servomechanisms which have been used heretofore. By eliminating the servomechanisms, the expense and complexity of the system is reduced and the weight penalty is also reduced.

The present invention employs a fluid actuator for imparting steering movement to the nose gear in response to receiving fluid under pressure. A four-way valve controls the flow of fluid under pressure to the fluid actuator and therefore controls the steering movement of the nose gear. A primary feature of this invention is the use of a simple on-off type of electrical circuit means for controlling the four-way valve. This simple on-off control system reduces the cost, weight, and complexity of the system.

More particularly, the fluid actuator may be of the conventional piston cylinder type. The four-way valve may be of the type which has a neutral position in which both sides of the piston of the fluid actuator are connected to return pressure, a first turning position in which one side of the piston is supplied with fluid under pressure while the other side of the piston is open to return pressure, and a second turning position in which fluid pressure is applied to said other side of the piston and said one side of the piston is open to return pressure. Thus, in either of the turning positions, the piston of the fluid actuator is being moved continuously to thereby continuously affect the rate of turn of the nose gear. Of course, in the first turning position the nose gear is being turned in one direction and in the second turning position it is being turned in the opposite direction. Preferably, suitable biasing means, such as a spring, is provided to normally bias the four-way valve to the neutral position. When the valve is in the neutral position, both sides of the piston are open to return pressure and the fluid actuator retards any change of direction of the nose gear and also acts as a shimmy damper. Pressure compensated flow control valves are utilized to maintain a constant flow rate to the fluid actuator when the four-way valve is in the turning position.

The four-way valve is controlled electrically by a pair of solenoids, one of which is energizable to cause the four-way valve to assume the first turning position and the second of which is energizable to cause the four-way valve to assume the second turning position. A simple on-off electrical circuit is utilized to selectively energize and de-energize the two solenoids.

Preferably, the electrical circuit means includes a pair of double throw spring loaded off switches, either of which is closable to selectively energize either of the solenoids. Override means are provided for allowing the first of the switches to be closed to override the other switch so long as the first switch remains closed. Accordingly, if the pilot closes one of the switches to cause the aircraft to turn in one direction and subsequently the copilot closes the other of the switches in a manner to tend to cause the aircraft to turn in the opposite direction, the override means is operative to prevent the switch closed by the copilot from having any effect on the system.

When the aircraft is in flight, the nose gear is retracted into a compartment within the fuselage in the usual manner. At this point it is desirable to totally disable the steering system so that no steering movement can be imparted to the nose gear by the steering system. If any steering movement were imparted to the nose gear when the nose gear is retracted within its compartment in the fuselage, damage to the nose gear or to other parts of the aircraft may occur. Accordingly, a switch is provided to open the electrical circuit automatically prior to the time that the nose gear is retracted. Preferably, the switch for accomplishing this function is located on the drag strut for the nose gear so that the circuit is opened as the nose gear begins its movement to the retracted position.

The invention, both as to its organization and method of operation, together with further features and advantages thereof may best be understood by reference to the following description taken in connection with the accompanying drawing, in which:

FIG. 1 is a schematic view of a nose gear steering system constructed in accordance with the teachings of this invention with the nose gear being diagrammatically illustrated in plan; and FIG. 2 is a fragmentary elevational view showing a portion of the strut assembly for mounting the nose gear and the switch for de-energizing the electrical circuit when the nose gear is being retracted.

Referring to the drawing, and in particular to FIG. 1 thereof, reference numeral 11 designates a nose gear steering system constructed in accordance with the teachings of this invention. The nose gear steering system 11 is operative to impart pivotal steering movement to a nose gear 13 through a suitable nose gear mounting means 15 which includes a laterally extending tab 17. The forward direction is illustrated by the arrow in FIG. 1. Although the steering system 11 is described herein with reference to a nose gear for an aircraft, it should be understood that the system may be used to steer various wheels on different types of vehicles, if desired.

Briefly, the steering system 11 includes a fluid actuator 19, a four-way valve 21, and an on-off electrical control means or system 23 for controlling the valve 21. Various types of fluid actuators may be employed. However, it is preferred to utilize a hydraulic actuator which includes a cylinder 25 having a piston 27 slidably mounted therein. The piston 27 is connected by a connecting rod 29 to the tab 17 of the nose gear mounting assembly. Thus, movements of the piston 27 are imparted to the nose gear 13 through the connecting rod 29 and the nose gear mounting assembly 15. Although the connecting rod 29 is shown as being directly rigidly connected to the tab 17, it should be understood that various intermediate linkages may be utilized, if desired.

The four-way valve 21 is interconnected to the cylinder 25 by a pair of conduits 31 and 33. The conduits 31 and 33 are connected to a pair of ports 34a and 34b in the cylinder 25 which are located adjacent opposite ends of the cylinder so that the fluid supplied therethrough will act on opposite faces of the piston 27. The four-way valve 21 is also connected to a supply conduit 35 which supplies fluid under pressure and to a return conduit 37 which returns the fluid to a suitable reservoir (not shown). The return pressure is very low and may be substantially zero p.s.i. gauge.

The four-way valve 21 is preferably a three-position spring-centered valve. The three positions of the valve include a neutral position in which both of the conduits 31 and 23 are connected to the return conduit 37 and therefore no fluid under pressure is supplied to the cylinder 19. The valve 21 also has two turning positions. In the first or left turning position, the conduit 33 is connected to the source of fluid under pressure through the supply conduit 35 and the conduit 31 is connected to the return conduit 37. In the second or right turning position, the conduit 31 is connected to the fluid under pressure in the supply conduit 35 and the conduit 33 is connected to the return conduit 37.

Pressure-compensated flow control valves 39 and 41 are provided in the conduits 31 and 33, respectively. Each of the valves 39 and 41 were operative to maintain the rate of fluid flow from the valve 21 to the cylinder 25 constant regardless of any upstream or downstream pressure changes whenever the valve 21 is in the turning position which supplies fluid under pressure therethrough. Thus, the valves 39 and 41 maintain the rate of movement of the piston 27 substantially constant during both turning positions.

Suitable biasing means, such as springs 43 are provided to normally urge the four-way valve 21 toward the neutral position thereof. When the aircraft is on the ground, the springs 43 are normally operative to maintain the four-way valve 21 in the neutral position. Thus, both of the conduits 31 and 33 and hence both faces of the piston 27 are exposed to return pressure. Thus, the actuator 19 imparts no steering movement to the nose gear 13.

If an external force acts on the nose gear 13 tending to impart steering pivotal movement there to, it is apparent that no such movement can occur without causing a corresponding amount of axial movement of the piston 27 within the cylinder 25. Such movement of the piston 27 is resisted by the fluid in the cylinder 25 which would have to be forced out of the relatively small ports 34a and 34b into one of the conduits 31 or 33, depending upon the direction of the external force. Thus, the actuator 19 acts as a shock absorber or shimmy damper to substantially reduce the effect of any external forces on the nose gear 13 which tend to impart a steering movement thereto. Stated another way, with the valve 21 in the neutral position, the actuator 19 resists any sudden change of steering movement on the part of the nose gear 13.

By moving the four-way valve 21 to the first turning position, the conduit 33 is connected to the fluid under pressure in the conduit 35 and the conduit 31 is connected to the return conduit 37. This causes fluid under pressure to flow through the conduit 33 and the valve 41 to the righthand face of the piston 27. The valve 41 is operative to maintain a constant flow rate thereacross regardless of changes in supply pressure or in the resistance afforded by the piston 27. With the valve 21 in the first turning position, the fluid on the righthand face of the piston 27 forces the piston to the left. The piston 27 therefore expels the fluid on the lefthand side thereof through the valve 39, the conduit 33, to the return conduit 37. The valve 39 provides no substantial resistance to this reverse flow. Because the flow control valve 41 supplies fluid at a constant rate, the piston 27 moves to the left at a constant rate to thereby cause pivotal steering movement of the nose gear 13 in the counterclockwise direction as viewed in FIG. 1. So long as the valve 21 remains in this first turning position, the piston 27 will continue its movement to the left and the nose gear 13 will continue to pivot in the counterclockwise direction until the piston 27 reaches the end of its stroke at the extreme left-hand end of the cylinder 25. If the valve 21 is returned to the neutral position from the first turning position, the nose gear 13 will remain in the selected angular steering position until external forces act to straighten the wheel out or until the valve 21 is moved to the second turning position in which fluid under pressure is supplied through the conduit 31 and the conduit 33 is connected to the return conduit 37.

When the aircraft is moving along the ground, with the nose gear 13 set at an angle, the natural tendency of the nose gear 13 is to straighten out. Thus, if the valve 21 is moved to the neutral position with the aircraft moving, the nose gear 13 will ordinarily automatically assume a substantially straight-ahead orientation. Of course, the nose gear 13 can be turned in the clockwise direction as viewed in FIG. 1 by merely moving the four-way valve 21 to the second steering position.

It is apparent, therefore, that only an on-off type of control system is required for controlling the four-way valve 21. The electrical control means 23, which is of low weight and quite inexpensive, is one preferred manner of accomplishing this on-off type of control.

The control means 23 includes a pair of solenoids 45 and 47 for operating the four-way valve 21. When the solenoid 45 is energized, it causes the valve 21 to assume the first turning position and when the solenoid 47 is energized the valve 21 assumes the second turning position. Solenoid-operated valves of this type are conventional. The control circuit 23 is so designed that the solenoids 45 and 47 cannot be energized at the same time.

A conductor 49 interconnects a solenoid relay 51 with the solenoid 45. The solenoid relay 51, which is illustrated in the de-energized condition, includes a coil 53, a switch arm 55 for selectively closing contacts 57 and 59 or contacts 57 and 61, and a second switch arm 63 for selectively closing contacts 65 and 67 or contacts 65 and 69. The contact 59 is electrically connected to the conductor 49 and the contact 65 is connected to ground.

A conductor 71 interconnects the solenoid 47 to a second solenoid relay 51' which is identical to the solenoid relay 51. Corresponding primed reference characters are utilized to designate corresponding parts of the solenoid relays 51 and 51'. The coil 53 is connected to ground through a conductor 73, the contact 65', the switch arm 63', and the contact 69'. Another conductor 75 interconnects the contacts 57 and 57'. The coil 53' is connected to ground through a conductor 76 and the switch arm 63 and the contact 59' is electrically connected to the conductor 71.

A pair of identical double throw turning switches 77 and 77' are electrically connected to the coils 53 and 53' by a pair of conductors 79 and 81. The turning switch 77 includes a switch arm 83 which is selectively movable to close the contacts 85 and 87 and the contacts 85 and 89. The switch arm 83 is normally biased to a neutral position in which the switch arm 83 engages neither of the contacts 87 nor 89. Corresponding parts of the switch 77' are identified by corresponding primed reference characters. As shown, the contacts 87 and 87' are electrically connected to the coil 53' by the conductor 81 and the contacts 89 and 89' are electrically connected to the coil 53 by the conductor 79. Another conductor 91 electrically connects the contacts 85 and 85'.

Power is supplied from a main bus 93 through a main relay 95 to the turning switches 77 and 77'. The main relay 95 includes a coil 97 and a switch arm 99 for interconnecting contacts 101 and 103 and contacts 101 and 105. The contact 105 is electrically connected by a conductor 107 to the conductor 75 and by a conductor 109 to the contact 85 of the turning switch 77.

The coil 97 is energizable by power from the main bus 39 through a circuit breaker 111 and a main switch 113 which is in the open position illustrated when the nose gear 13 is retracted into the fuselage (not shown) of the aircraft. Closure of the main relay 113 also causes an indicator light 115 to become energized. Power is supplied to the contact 101 of the main relay from the main bus 93 through a circuit breaker 117.

When the aircraft is in flight and the nose gear 113 is retracted, the electrical circuit 23 is in the condition illustrated in FIG. 1. In this condition, the main switch 113 is open so the coil 97 remains de-energized and no power is supplied to the turning switches 77 and 77' because the switch arm 99 is in engagement with the contact 103 which is disconnected from the control circuit. Prior to the time that the aircraft lands, the nose gear 13 is lowered out of the fuselage. The main switch 113 closes in response to the lowering of the nose gear 13. Closure of the switch 113 energizes the relay 97 and illuminates the indicator light 15 to let the pilot know that the landing gear is safely down and that the switch 113 has operated satisfactorily. Energization of the relay 97 draws the switch arm 99 into engagement with the contact 105 so that power is supplied from the main bus 93 through the switch arm 99, the contact 105, and the conductor 109 to the switches 77 and 77'. No current will flow through the conductor 107 because the switch arms 55 and 55' are in engagement with the contacts 61 and 61' which are not electrically connected to the control circuit 23.

So long as either of the switch arms 83 or 83' remain in the neutral position shown in the drawing, no power will be supplied to either of the solenoid relays 51 and 51'. Assuming that the pilot wishes to turn the aircraft to the right after it has landed, he moves the switch arm 83 so that it engages the contact 87. This supplies current to the coil 53' to energize the latter through the conductor 81. Energization of the coil 53' draws the switch arms 55' and 63' into engagement with the contacts 59' and 67', respectively. Accordingly, current is suplied through the conductors 107 and 75, the switch arm 55', and the conductor 71 to energize the solenoid 47. Energization of the solenoid 47 causes the four-way valve 21 to assume the second or right turning position described hereinabove.

One feature of this invention is the provision of override means for allowing the first of the switches 77 and 77' to be closed to override the other of the switches so long as the first switch remains closed. Thus, with the aircraft being turned to the right, as described above, if the copilot moves the switch arm 83' into engagement with the contact 89' in an effort to turn the aircraft to the left, such movement of the switch arm 83' will have no effect on the system. With the switch arm 83' engaging the contact 89', the coil 53 will not be energized because the switch arm 63' is in engagement with the contact 67' and no path for grounding coil 53 is available.

It is apparent that the pilot can turn the aircraft to the left by moving the switch arm 83 into engagement with the contact 89. This de-energizes the coil 53' to allow the switch arms 55' and 63' to return to their de-energized positions in which they engage contacts 61' and 69', respectively. This permits energization of the coil 53 through the conductors 79 and 73 and the contact 69' which is connected to ground. Energization of the coil 53 causes the switch arm 55 to engage the contact 59 and supply current to the solenoid 45 through the conductor 49. Energization of the coil 53 also moves the switch arm 63 into engagement with the contact 67 to thereby preclude energization of the coil 53'. Thus, the override means is effective for both turning positions. It is readily apparent that the switch arm 83' can be similarly operated to cause energization of either of the solenoids 51 and 51'. Likewise, when the switch 77' is initially operated to energize one of the solenoids 51 or 51', the override means is effective to preclude the operation of the switch 77 from having an effect on the control of the steering movement of the nose gear 13.

The main switch 113 can be actuated in many different ways. FIG. 2 illustrates in semidiagrammatic fashion one preferred way for actuating the switch 113. FIG. 2 illustrates a main strut 119 suitably mounted to an aircraft (not shown) for pivotal movement about a pivot point 121. The lower end of the strut 119 is connected to the nose gear 13 and the strut 119 is pivotable about the point 121 for the purposes of lowering and retracting the nose gear 13. A drag strut 123 interconnects the strut 119 with a suitable structural portion of the aircraft. As shown in FIG. 2, the drag strut 123 includes a pair of links 125 and 127 pivotally interconnected adjacent the inner ends thereof by a pin 129. The switch 113 is mounted on the link 125 and has a button 131 which is depressed by the inner face of the link 127 when the nose gear 13 is substantially completely lowered. Depressing of the button 131 acts to close the switch 113 to supply power to the main relay 99 and the turning switches 77 and 77' as described hereinabove. The strut 119 is preferably provided with a nose wheel centering cam (not shown) for centering the nose gear 113 as it is retracted so that it will assume the proper angular relationship relative to the aperture in the fuselage of the aircraft for receiving same.

Although an exemplary embodiment of the invention has been shown and described, many changes, modifications, and substitutions may be made by one having ordinary skill in the art without necessarily departing from the spirit and scope of this invention.

What is claimed is:
1. In a system for steering an aircraft, the combination of:
   a nose gear for the aircraft;
   fluid actuator means for moving said nose gear in first and second steering directions, said fluid actuator means having first and second inlet ports therein and being responsive to receiving fluid through said first port for moving the nose gear in said first direction and responsive to receiving fluid through said second port for moving said nose gear in said second direction;
   valve means for selectively supplying fluid to said fluid actuator means through said first and second ports and for discontinuing the supply of fluid to said ports;
   solenoid means for operating said valve means to cause said valve means to supply fluid through either of said ports and to discontinue the supply of fluid to said ports;
   said solenoid means including two separate coils, one of said coils being energizable to cause said valve means to supply fluid through said first port and the other of said coils being energizable to cause said valve means to supply fluid through said second port;

pilot and copilot switch means either of which is closable to selectively energize said first and second coils; and override means for allowing the first of said switch means to be closed to override the other of said switch means so long as said first switch means remains closed.

2. A combination as defined in claim 1 including flow control means for maintaining the rate of fluid flow to said fluid actuator means substantially constant when said valve means is operated to supply fluid to said fluid actuator means.

3. In a fluid control system for steering a nose gear of an aircraft, the combination of:

a fluid actuator including a cylinder and a piston slidable in said cylinder, said cylinder having first and second inlet ports for admitting fluid to said cylinder on opposite sides of said piston;

a four-way valve;

first and second conduit means for interconnecting said first and second ports of said cylinder, respectively, to said four-way valve means;

a return conduit connected to said four-way valve;

said four-way valve being movable between a neutral position in which said first and second conduit means are connected to said return conduit, a first turning position in which said first conduit means is interconnected to a supply of fluid under pressure and said second conduit means is interconnected to the return conduit and a second turning position in which said first conduit means is interconnected to the return conduit and said second conduit means is interconnected to the supply of fluid under pressure;

biasing means for urging said valve element toward said neutral position;

solenoid means for selectively moving said movable valve element to either of said turning positions; and flow control valve means in each of said first and second conduit means for maintaining the flow of fluid therethrough to said fluid actuator means substantially constant when fluid is supplied thereto by said four-way valve means.

4. A combination as defined in claim 3 wherein the nose gear is retractable and including circuit means for selectively energizing said solenoid means and means responsive to the retraction of said nose gear for automatically opening said circuit means to prevent said circuit means from operating said solenoid means.

5. In a system for steering an aircraft, the combination of:

a nose gear for the aircraft;

fluid actuator means for moving said nose gear in first and second steering directions, said fluid actuator means having first and second inlet ports therein and being responsive to receiving fluid through said first port for moving the nose gear in said first direction and responsive to receiving fluid through said second port for moving said nose gear in said second direction;

valve means for selectively supplying fluid to said ports of said fluid actuator means and for discontinuing the supply of fluid to said fluid actuator means;

electrically energizable valve operator means for operating said valve means to supply fluid to either of said ports and to discontinue the supply of fluid to said ports;

circuit means for energizing said valve operator means;

said circuit means including pilot and copilot switch means either of which is operable to energize said valve operator means to cause said nose gear to move in either of said direction; and said circuit means including override means for allowing the first of said switch means to be closed to override the other of said switch means so long as said first switch means remains closed.

6. In a nose gear steering system for an airplane, the combination of:

a wheel connectible to the airplane for undergoing steering movement relative to the airplane to turn the airplane in either of first or second directions;

fluid actuator means responsive to the supply of operating fluid thereto for imparting steering movement to said wheel in either of the first and second directions;

valve means for controlling the supply of operating fluid to said fluid actuator means, said valve means having first and second turning positions in which said valve means supplies fluid to said fluid actuator means to cause said fluid actuator means to turn said wheel in said first and said second directions, respectively, and a neutral position in which the fluid actuator means exerts substantially no turning influence on said wheel;

first solenoid means energizable to move said valve means to said first turning position thereof;

second solenoid means energizable to move said valve means to said second turning position thereof;

means for moving said valve means to said neutral position;

circuit means including first and second switch means, either of which is operable to selectively energize either of said solenoid means, said first switch means being movable between first and second positions; and said circuit means including first relay means responsive to said first switch means being in said first position to complete a circuit to energize said first solenoid means and to prevent said second switch means from energizing either of said solenoid means.

7. A combination as defined in claim 6 wherein said circuit means also includes second relay means responsive to said first switch means being in said second position thereof to complete a circuit to energize said second solenoid means and to prevent said second switch means from energizing either of said solenoid means.

References Cited

UNITED STATES PATENTS

| | | | |
|---|---|---|---|
| 2,906,474 | 9/1959 | Cravero | 244—50 |
| 2,953,324 | 9/1960 | Barr et al. | 244—50 |
| 2,988,056 | 6/1961 | Rumsey | 244—50 XR |
| 3,007,655 | 11/1961 | Criswell et al. | 244—50 |
| 3,035,793 | 5/1962 | Ralph et al. | 244—50 |
| 3,211,400 | 10/1965 | Booth | 244—50 |
| 3,391,580 | 7/1968 | Stadler | 244—50 XR |
| 2,543,233 | 2/1951 | Dowty | 244—50 |
| 2,621,002 | 12/1952 | Pittman | 244—50 |
| 2,712,422 | 7/1955 | Gerwig | 244—50 |
| 2,734,589 | 2/1956 | Groen | 244—50 |
| 3,166,143 | 1/1965 | Gonter et al. | 244—50 X |

MILTON BUCHLER, *Primary Examiner.*

PAUL E. SAUBERER, *Assistant Examiner.*

U.S. Cl. X.R.

180—79.2; 244—103